(12) United States Patent
Al-Harthi et al.

(10) Patent No.: US 11,827,734 B1
(45) Date of Patent: Nov. 28, 2023

(54) METHOD OF MAKING A POLYOLEFIN

(71) Applicants: KING FAHD UNIVERSITY OF PETROLEUM AND MINERALS, Dhahran (SA); S-Oil Corporation, Seoul (KR)

(72) Inventors: Mamdouh A. Al-Harthi, Dhahran (SA); Sung-Gil Hong, Seoul (KR); Hassam Mazhar, Dhahran (SA); Farrukh Shehzad, Dhahran (SA)

(73) Assignees: KING FAHD UNIVERSITY OF PETROLEUM AND MINERALS, Dhahran (SA); S-Oil Corporation, Seoul (KR)

( * ) Notice: Subject to any disclaimer, the term of this patent is extended or adjusted under 35 U.S.C. 154(b) by 0 days.

(21) Appl. No.: 17/941,600

(22) Filed: Sep. 9, 2022

(51) Int. Cl.
| | | |
|---|---|---|
| *C08F 4/02* | (2006.01) | |
| *C08F 4/6592* | (2006.01) | |
| *C08F 210/16* | (2006.01) | |
| *C08F 4/659* | (2006.01) | |
| *C08F 4/639* | (2006.01) | |

(52) U.S. Cl.
CPC ...... *C08F 4/65912* (2013.01); *C08F 4/63916* (2013.01); *C08F 4/65927* (2013.01); *C08F 210/16* (2013.01)

(58) Field of Classification Search
CPC ...... C08F 4/02; C08F 4/6592; C08F 4/86912; C08F 4/65916; C08F 10/02
See application file for complete search history.

(56) References Cited

U.S. PATENT DOCUMENTS

| | | |
|---|---|---|
| 2002/0193537 A1 | 12/2002 | Ewen |
| 2019/0284350 A1 | 9/2019 | Al-Harthi et al. |
| 2020/0317829 A1 | 10/2020 | O'Hare et al. |

FOREIGN PATENT DOCUMENTS

| | | |
|---|---|---|
| EP | 3 322 738 B1 | 10/2019 |
| WO | 2020/120935 A1 | 6/2020 |

OTHER PUBLICATIONS

Kenyon, et al. ; Controlling the activity of an immobilized molecular catalyst by Lewis acidity tuning of the support ; Journal of Catalysts, vol. 402 ; Oct. 2021 ; 7 Pages.

Losio, et al. ; Ethylene-Propene Copolymerization with C1-symmetric ansa-Fluorenyl-zirconocene Catalysts: Effects of Catalyst Structure and Comonomer on Molar Mass ; Chinese Journal of Polymer Science 38 ; 2020 ; 11 Pages.

*Primary Examiner* — Caixia Lu
(74) *Attorney, Agent, or Firm* — Oblon, McClelland, Maier & Neustadt, L.L.P.

(57) ABSTRACT

A method of making a polyolefin including, mixing a layered double hydroxide (LDH), and a zirconocene complex in a non-polar solvent to form a first mixture. The method further includes degassing the first mixture and adding an olefin to form a second mixture. The method further includes adding an aluminoxane cocatalyst to the second mixture and reacting for at least 10 minutes to form a reaction mixture including the polyolefin. The method further includes separating the polyolefin from the reaction mixture. The polyolefin has a melting temperature of 120-130° C. The zirconocene complex is supported on the LDH to form a supported catalyst complex in the first mixture.

17 Claims, 5 Drawing Sheets

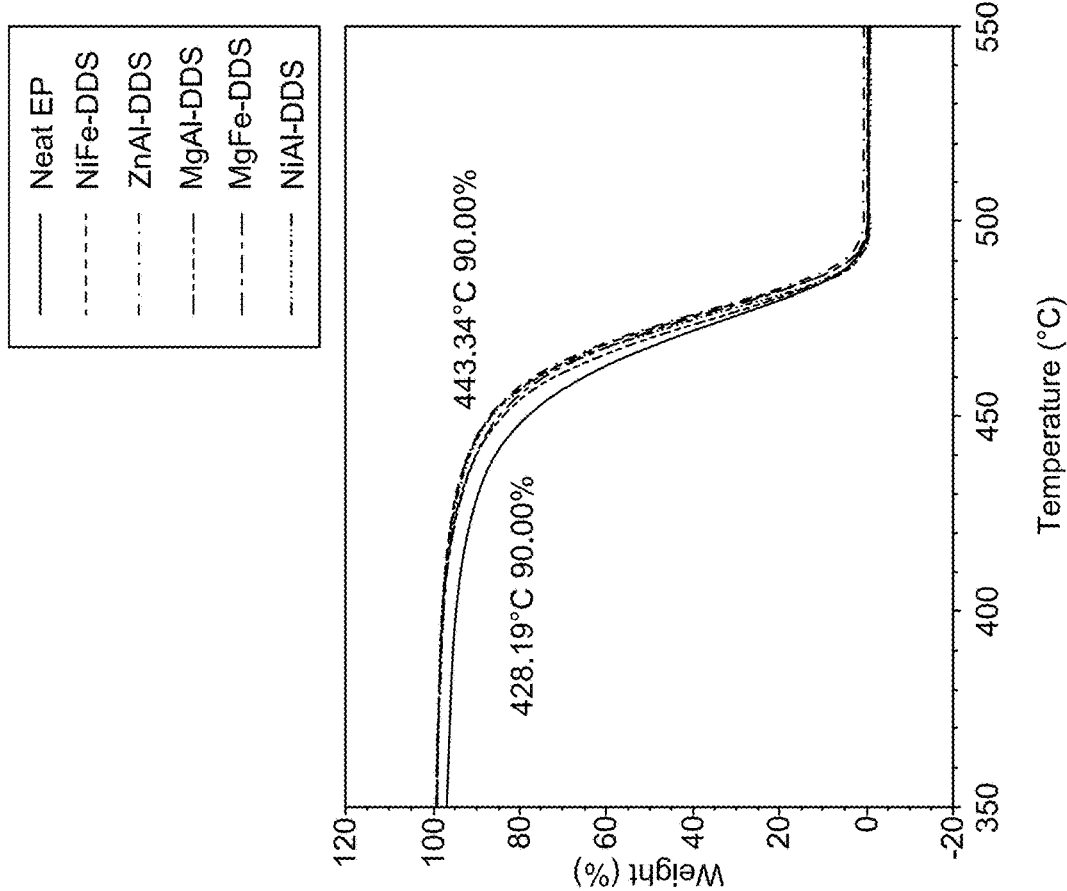
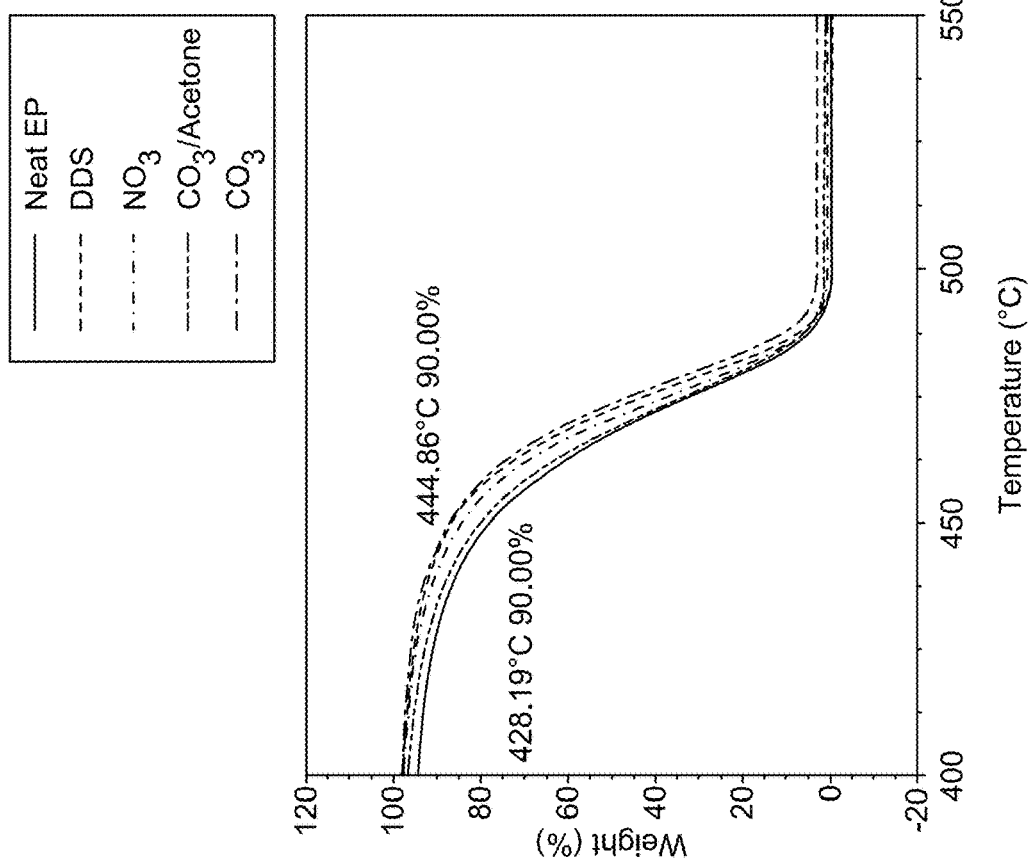
FIG. 3A
FIG. 3B

METHOD OF MAKING A POLYOLEFIN

BACKGROUND

Technical Field

The present disclosure in general is directed to a method of making a polyolefin, and particularly, to a method of making a polyolefin with a zirconocene catalyst supported on a layered double hydroxide.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Polyolefins offer a wide range of domestic and industrial applications with an estimated production of more than 186 million metric tons [T. J. Hutley, M. Ouederni, Polyolefins—the history and economic impact, 13-50, 2016], and are a major fraction of plastic materials. Zeigler-Natta catalysts are typically used in the mass production of polyethylene (PE) and $\alpha$-olefins for polymerization and include an aluminoxane activator with a metallocene transition metal catalyst. Metallocene catalysts present a well-defined active site, yielding polymers with a narrow molecular weight distribution [G. G. Hlatky, Heterogeneous single-site catalysts for olefin polymerization, Chem. Rev. 100 (2000) 1347-1376]. Variation in complexation and addition of a bridging group around a central metal of the catalyst can control the yield of the polymer produced [G. E. Hickman, C. M. R. Wright, A. F. R. Kilpatrick, Z. R. Turner, J. C. Buffet, D. O'Hare, Synthesis, characterisation and slurry phase ethylene polymerisation of rac-(PhBBI*) $ZrCl_2$ immobilised on modified layered double hydroxides, Mol. Catal. 468 (2019) 139-147]. Therefore, the catalyst is selected based on the targeted product.

There are challenges associated with unsupported catalysts in polyolefin synthesis including, lack of control over the morphology of the product and the reactor fouling which results in heat and mass transfer resistance. A supported catalyst provides better control over the polymer morphology, requires less co-catalyst, and provides the flexibility to tune the product properties. When using a supported catalyst, or heterogeneous catalyst, the chemical reaction takes place generally on such catalyst surface.

LDHs, also known as anionic clays, generally have a divalent or trivalent cation and can have a variety of intercalating anions. The intercalated anion balances the charge formed on the layers because of the substitution of divalent ions by trivalent metal ions, while the interlayer water provides structural stability owing to hydrogen bonding between the layers. LDHs have the potential to generate materials that satisfy specific requirements because of their low cost, easily customizable characteristics, and flexible nature. Over the last two decades, researchers have explored the idea of using layered inorganic materials as hosts to create inorganic-organic host-guest hybrids with desired chemical and physical properties, allowing for enchanted control over reaction rate, product distribution, and stereochemistry. LDHs are flexible in terms of composition, allowing for a wide range of intercalation anion options, which opens new possibilities for functional materials.

The use of an LDH or LDH nanocomposites is not widely explored in the field of polymerization. LDHs were initially reported as effective catalyst support for Ziegler Natta catalyst for olefin polymerization in 1973. It was observed that the supported catalyst retained its activity for a longer time as compared to the unsupported catalyst. Although the peak activity of the unsupported catalyst was higher than the supported catalyst, it reduced quickly to a lower value. The initial low activity of the supported catalyst was attributed to the steric hindrance which prevented the transfer of ethene monomer to the active sites inside the intercalated layers. The steric hindrance decreased with the reaction progress as the polyethene (PE) chains break up LDH into small fragments. The supported catalyst also altered the morphology of the product. PE produced with an unsupported catalyst exhibited a sponge-like structure while the supported catalyst produced PE with granular morphology consisting of both smooth and rough surfaces [Xu, Z. P., Zhang, J., Adebajo, M. O., Zhang, H., Zhou, C.: Catalytic applications of layered double hydroxides and derivatives. Appl. Clay Sci. 53, 139-150 (2011), and He, F.-A., Zhang, L.-M.: Organo-modified ZnAl layered double hydroxide as new catalyst support for the ethylene polymerization. J. Colloid Interface Sci. 315, 439-444 (2007)].

It is one object of the current disclosure to describe a method of making a polyolefin with a supported catalyst. It is another object of the current disclosure to develop a method of making a polyolefin with a catalyst supported on an LDH.

SUMMARY

In an exemplary embodiment, a method of making a polyolefin is described. The method includes mixing a layered double hydroxide (LDH), and a zirconocene complex in a non-polar solvent to form a first mixture. The method further includes degassing the first mixture and adding at least one olefin to form a second mixture. The method further includes adding an aluminoxane cocatalyst to the second mixture and reacting for at least 10 minutes to form a reaction mixture including the polyolefin. The method further includes separating the polyolefin from the reaction mixture. The polyolefin has a melting temperature of 120-130° C. The zirconocene complex is supported on the LDH to form a supported catalyst complex in the first mixture. The LDH is selected from the group consisting of a NiFe LDH, a ZnAl LDH, a MgAl LDH, a MgFe LDH, and a NiAl LDH, and the LDH has an intercalating anion selected from the group consisting of a carbonate anion, a carbonate/acetone anion, a nitrate anion, and a dodecyl sulfate (DDS) anion.

In some embodiments, the method further includes continuously injecting a supersaturated solution of the nonpolar solvent with the olefin during the reacting, wherein the supersaturated solution has 5-15 wt. % olefin, based on the total weight of the olefin and nonpolar solvent, wherein the supersaturated solution is injected under a pressure of 1-20 pound-force per square inch (psi), wherein the reacting takes place in a reactor with a hemispherical bottom and the injecting is at a plurality of locations along the circumference of the hemispherical bottom.

In some embodiments, the polyolefin has a unimodal melting temperature of 123-127° C.

In some embodiments, the polyolefin is stable up to 450° C.

In some embodiments, the polyolefin is stable from 430-450° C.

In some embodiments, a surface of the LDH is activated with methylaluminoxane prior to supporting the zirconocene complex in the supported catalyst complex.

In some embodiments, the supported catalyst complex has a weight ratio of the zirconocene complex to the LDH of 1 to 1-5.

In some embodiments, a molar ratio of a first and second metal in the LDH 2:1 to 4:1.

In some embodiments, the layered double hydroxide has a basal spacing of 0.5-3.0 nm.

In some embodiments, the layered double hydroxide has an intercalating anion selected from the group consisting of a carbonate anion, a carbonate/acetone anion, and a nitrate anion and a basal spacing of 0.5-1.0 nm.

In some embodiments, the layered double hydroxide has a DDS intercalating anion and a basal spacing of 2.0-3.0 nm.

In some embodiments, the zirconocene complex is bis (cyclopentadienyl) zirconium(IV) dichloride.

In some embodiments, the aluminoxane cocatalyst is methylaluminoxane.

In some embodiments, the olefin is at least one selected from the group consisting of ethene, propene, and butene.

In some embodiments, the olefin is 70-95 volume percent (v %) ethene and 5-30 v % propene based on a total volume of the olefin.

In some embodiments, the olefin has a pressure of 1-10 pound-force per square inch (psi) in the second mixture.

In some embodiments, the first mixture has a supported catalyst complex concentration of 0.1-0.5 milligram per milliliter (mg/mL).

In some embodiments, the polyolefin has 0.05 to 3 wt. % of the LDH, relative to the total weight of the polyolefin.

In some embodiments, the polyolefin has a higher melting temperature than a polyolefin made by the same method but wherein the zirconocene complex is not supported on an LDH.

In some embodiments, the polyolefin has a higher yield than a polyolefin made by the same method but wherein the zirconocene complex is not supported on an LDH.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A is a thermogravimetric analysis (TGA) plot depicting a 10% weight loss ($T_{0.9}$), while the LDH was kept constant (NiFe) and the intercalating anion was varied including DDS, $NO_3$, $CO_3$, and $CO_3$/Acetone, according to certain embodiments of the present disclosure;

FIG. 3B is a TGA plot depicting the $T_{0.9}$, while the intercalating anion was kept constant (DDS) and the LDH was varied including NiFe, MgFe, MgAl, NiAl, and ZnAl, according to certain embodiments of the present disclosure;

DETAILED DESCRIPTION

Figure 1A:
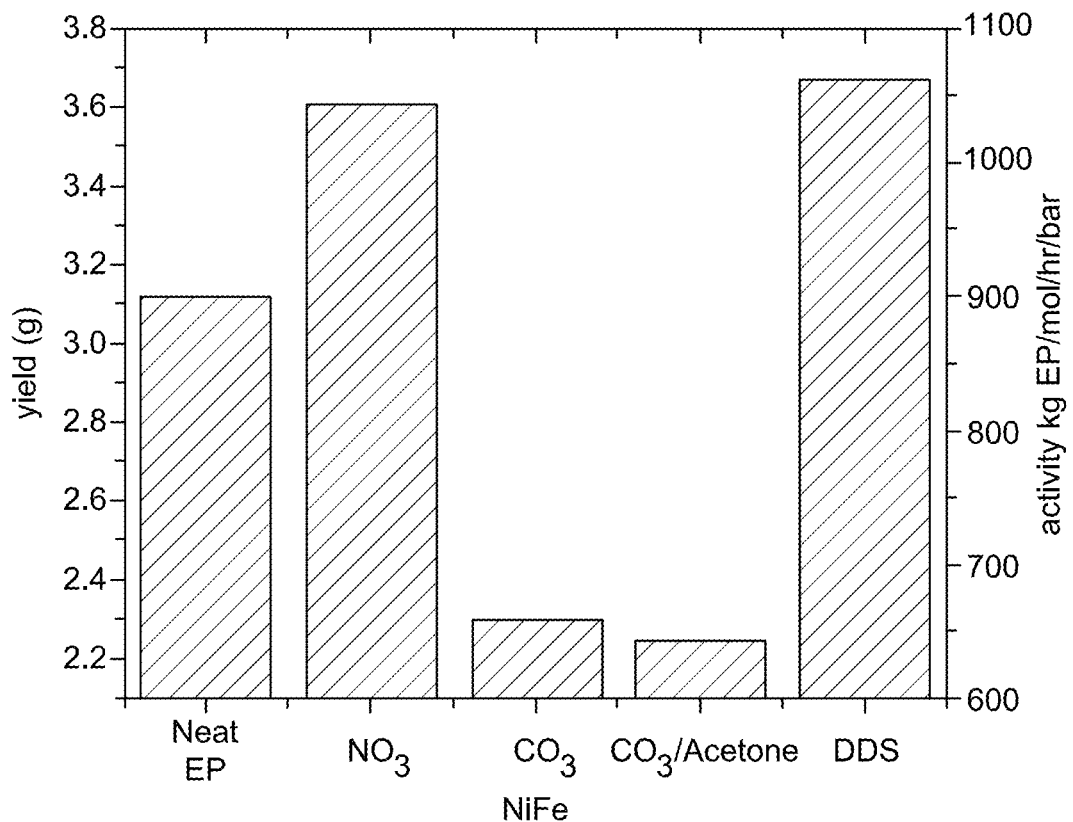
FIG. 1A is a graph depicting the yield of polymer and the activity of the catalyst (kg of EP per mol of catalyst per time and per pressure of olefin), while the LDH was kept constant (NiFe) and the intercalating anion was varied including DDS, $NO_3$, $CO_3$, and $CO_3$/Acetone, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term 'polyolefin' refers to a polymer with a general formula $(CH_2CHR)_n$ where R is an alkyl or alkenyl group. Polyolefins are formed through the polymerization of olefins, also referred to as olefin monomers. Examples of olefins include but are not limited to, ethene, propene, and butene. A polyolefin may be a copolymer of different types of olefin monomers, for example polymerized ethene and propene.

As used herein the term "thermal stability" or variations thereof refers to a temperature at which there is 10% weight loss of a sample during TGA analysis. For example, a sample with a thermal stability or stability up to 450° C. exhibits up to 10% weight loss at 450° C., above this temperature the sample will have a weight loss higher than 10%.

Aspects of the present disclosure are directed toward a method for the polymerization of an olefin with a zirconocene complex supported on a layered double hydroxide (LDH) to yield a polyolefin. The polyolefin obtained by the method of the present disclosure has a higher thermal stability and melting temperature than a polyolefin made by the same method but where the zirconocene complex is not supported on an LDH, and where no LDH is present in the polymerization process.

Figure 4:
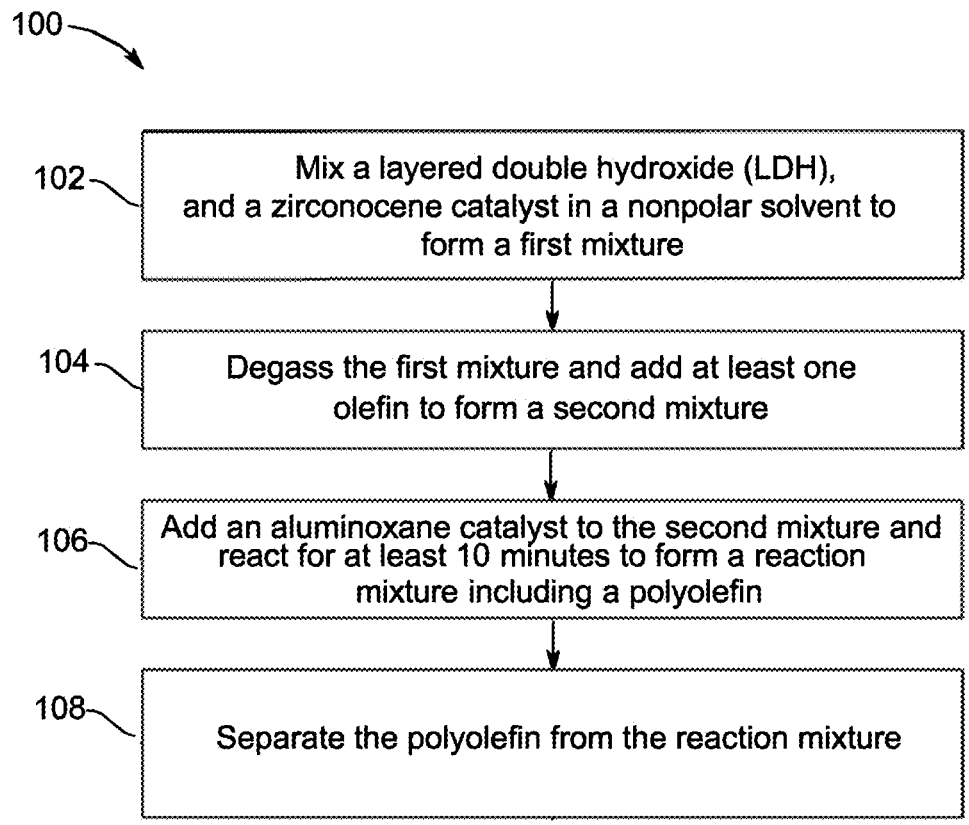
FIG. 4 is a schematic flow diagram of a method of making a polyolefin, according to certain embodiments of the present disclosure.

Referring to FIG. 4, a schematic flow diagram of a method 100 of making a polyolefin is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing an LDH, and a metallocene catalyst in a nonpolar solvent to form a first mixture. In some embodiments, the LDH, and the metallocene catalyst are mixed in a reactor with the nonpolar solvent under a nitrogen or argon environment, to obtain the first mixture. The metallocene catalyst may be a Ziegler-Natta polymerization catalyst useful for catalyzing olefin polymerization reactions from olefin monomers such as ethylene, propylene, n-butylene, 1-hexene, 1-octene as well as higher homologs and other olefin-containing compounds such as 1,3-butadiene. While any known heterogeneous Zeigler-Natta catalysts may be used, in preferred embodiments, the Zeigler-Natta catalyst is a homogeneous catalyst, for example, a metallocene catalyst based on complexes of Ti, Zr or Hf and which may be employed in combination with an organoaluminum co-catalyst (e.g., methylaluminoxane, MAO). The combination of metallocene catalyst and organoaluminum co-catalysts renders these catalyst mixtures soluble in a wide array of common organic solvents, hence their classification as homogeneous catalysts. A metallocene is type of sandwich compound, based on an organometallic complex featuring a metal bound by haptic covalent bonds to two arene ligands. A metallocene is a compound typically containing two substituted or unsubstituted cyclopentadienyl anions (i.e., "cp" which is $C_5H_5^-$) bound to a metal center (M) in the oxidation state II or IV, with the resulting general formula $(C_5H_5)_2M$ or $(C_5H_5)_2MX_2$, e.g., titanocene dichloride, vanadocene dichloride. When the metal of the metallocene is zirconium, the complex is then referred to as zirconocene.

In an embodiment, the metallocene complex is zirconocene. In an embodiment, the zirconium has an oxidation state of −2, 0, 1, 2, 3, or 4. In an embodiment, the zirconium has an oxidation state of 4. In an embodiment, the zirconocene complex is any zirconocene complex known in the art. In an embodiment, is the zirconocene complex is dichloro [rac-ethylenebis(indenyl)] zirconium (IV), dimethylsilylbis-(indenyl)zirconium dichloride, cyclopropylsilylbis(indenyl)-zirconium dichloride, or zirconocene dichloride. In some embodiments, the zirconium (IV) complex is zirconocene dichloride.

LDHs are a class of ionic solids characterized by a layered structure with the generic layer sequence $[AcBZAcB]_n$, where c represents layers of metal cations, A and B are layers of hydroxide (HO$^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. LDHs may be formed with a wide variety of anions in the intercalated layers (Z), such as dodecyl sulfate (DDS) $(CH_3(CH_2)_{11}OSO_3^-)$, Cl$^-$, Br$^-$, nitrate (NO$_3^-$), carbonate (CO$_3^{2-}$), SO$_4^{2-}$, acetate $(C_2H_3O_2)$, SeO$_4^{2-}$, and combinations thereof. The size and properties of the intercalated anions may have an effect on the spacing of the layers in the LDH, known as the basal spacing. In an embodiment, the LDH has a basal spacing of 0.5 to 3 nm, preferably 1 to 2.5 nm, or 1.5 to 2 nm. In an embodiment, an LDH with an intercalated anion such as a carbonate anion, a carbonate/acetone anion, and a nitrate anion has a basal spacing of 0.5 to 1.0 nm, preferably 0.6 to 0.9 nm, or 0.7 to 0.8 nm. In an embodiment, an LDH with an intercalated anion such as a DDS anion has a basal spacing of 2.0 to 3.0 nm, preferably 2.2 to 2.8 nm, or 2.4 to 2.6 nm. The DDS anion can delaminate the LDH, or split apart the layers, creating larger gaps in the LDH due to its large size, and the hydrophobicity of the dodecyl alkyl tail.

An LDH may be a synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations, also labeled as a first and second metal, respectively. In an embodiment, the divalent ion is selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and/or $Zn^{2+}$. In an embodiment, the trivalent ion is selected from the group consisting of $N^{3+}$ is $Al^{3+}$, $Mn^{3+}$, $Cr^{3+}$, $Fe^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In an embodiment, a molar ratio of a first and second metal in the LDH 2:1 to 4:1, preferably 2.4:1 to 3.8:1, preferably 2.8:1 to 3.2. In an embodiment, a molar ratio of a first and second metal in the LDH is 1:1.

In preferred embodiments, the layered double hydroxide has a DDS intercalated anion. In a preferred embodiment, the LDH is a Zn(II)/Al(III) layered double hydroxide (zinc-aluminum LDH or ZnAl LDH), where some $Zn^{2+}$ in a brucite-like structure (crystalline $Zn(OH)_2$) is substituted by $Al^{3+}$. In another preferred embodiment, the LDH is a Ni(II)/Fe(III) layered double hydroxide. In some embodiments, the LDH does not comprise graphene.

In an embodiment, the layered double hydroxide component may have a particulate form, for example in the form of spheres, granules, whiskers, sheets, flakes, plates, foils, fibers, and the like. In some embodiments, he layered double hydroxide particles may have a particle size of 40 to 100 nm, preferably 45 to 90) nm, preferably 50 to 80 nm, preferably 55 to 75 nm, preferably 60 to 70 nm. In some embodiments, the layered double hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered double hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm.

In some embodiments, the zirconocene complex is supported on a support material to form a supported catalyst complex in the first mixture. A catalyst support refers to a solid material to which the catalyst is affixed, typically through interactions with atoms present on the surface of the support. The support may be inert or participate in the catalytic reaction. Common supports include carbon, alumina, and/or silica. By affixing a catalyst to the support the catalyst does not dissolve in the reaction solution and instead forms a heterogeneous catalyst, or a catalyst with a different phase than the reactants or products.

The amount of surface area available to the catalyst on the support and the accessibility of that surface area to reactant chemisorption and product desorption affect the activity of the catalyst, i.e., the rate of conversion of reactants to products. Therefore, the surface area must be accessible to reactants and products as well as to heat flow. The chemisorption of a reactant by a catalyst surface is preceded by the diffusion of that reactant through the internal structure of the catalyst and the catalyst support. In the case of the present disclosure, the reactant is an olefin. The catalytic reaction of the reactant to a product is followed by the diffusion of the product away from the catalyst and catalyst support. Since the active catalyst compounds are often supported on the internal structure of a support, the accessibility of the internal structure of a support material to reactant(s), product(s) and heat flow is important. In the case of the present disclosure, the olefin must be able to access the internal structure of the LDH to access the zirconocene complex.

In a preferred embodiment, the zirconocene complex is supported on an LDH. In some embodiments, the LDH is activated prior to affixing the zirconocene complex to the surface. In an embodiment, an aluminoxane, preferably methylaluminoxane, is used to activate the LDH. The Al atom in the methylaluminoxane forms a covalent bond with a surface hydroxyl group of the LDH and thereby activates the support for anchoring a catalyst molecule. Therefore, the hydroxyl groups present in the A and B layers of the LDH are employed to affix the zirconocene to the surface. This may change the spacing between these layers and have an effect on how much of the zirconocene is able to attach to the surface of the LDH. Larger spacing between the layers as discussed previously by employing an anion such as DDS, may allow for more zirconocene to affix to the surface of the LDH and improve the activity of the supported catalyst complex.

In an embodiment, the supported catalyst complex has a weight ratio of the zirconocene complex to the support of 1 to 1-10, preferably, 1 to 10, 1 to 9, 1 to 9, 1 to 7, 1 to 6, 1 to 5, 1 to 4, 1 to 3, 1 to 2, or 1 to 1. In some embodiments, the support is an LDH. In an embodiment, the supported catalyst complex has a weight ratio of the zirconocene complex to the LDH of 1 to 1-10, preferably, 1 to 10, 1 to 9, 1 to 9, 1 to 7, 1 to 6, 1 to 5, 1 to 4, 1 to 3, 1 to 2, or 1 to 1.

In some embodiments, the non-polar solvent is an aromatic solvent, most preferably an aromatic hydrocarbon. Exemplary aromatic solvents include, but are not limited to, benzene, ethylbenzene, o-xylene, m-xylene, p-xylene, and mixtures of xylenes, toluene, mesitylene, anisole, 1,2-dimethoxybenzene, $\alpha,\alpha,\alpha$,-trifluoromethylbenzene, and fluorobenzene. In some embodiments, the organic solvent is an alkane solvent. Exemplary alkane solvents include, but are not limited to, pentane, cyclopentane, hexanes, cyclohexane, heptanes, cycloheptane, and octanes. In preferred embodiments, the organic solvent is toluene. Other organic solvents that me be used, particularly as co-solvents, include ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme, triglyme), chlorinated solvents (e.g. chlorobenzene, dichloromethane, 1,2-dichloroethane, 1,1-dichloroethane, chloroform, carbon tetrachloride), ester solvents (e.g. ethyl acetate, propyl acetate), ketones (e.g. acetone, butanone). Mixtures of any of the above organic solvents may also be utilized.

The amount of organic solvent employed may be varied, but typically the organic solvent may be added so that the supported catalyst complex has a weight in mg to volume of solvent (mL) of 0.1 to 2 mg/mL, preferably 0.5 to 1 mg/mL, preferably 0.75 to 1.5 mg/mL. In an embodiment, the first mixture has a supported catalyst complex concentration of 0.1-0.5 mg/mL, preferably 0.2-0.4 mg/mL, or approximately 0.3 mg/mL.

At step 104, the method 100 further includes degassing the first mixture and adding at least one olefin to form a second mixture. Preferably, the olefin contains at least one $\alpha$-olefin group but may contain more than one in the case of diene or polyene monomers. The olefin may be a single monomer if a homopolymer is desired or a mixture of monomers if a copolymer is desired. Olefins suitable for polymerization reactions are known to those of ordinary skill and may include olefin monomers having 2 to 12 carbons, preferably 3 to 10 carbons, preferably 4 to 8 carbons, preferably 5 to 6 carbons, examples of which include ethene, propene, butene, isobutene, 1,3-butadiene, 1-pentene, 1-hexene, hexadiene, 1-octene, 1-decene, isoprene, styrene, 4-methylpent-1-ene, and the like. In an embodiment, the at least one olefin is selected from the group consisting of ethene, propene, and butene. In an embodiment, the at least one olefin includes 70-95 volume percent (v %) ethene and 5-30 v % propene based on a total volume of the olefin. In an alternate embodiment, the at least one olefin may be 80-85 v % ethene and 15-25 v % propene based on the total volume of the at least one olefin. In an embodiment, the olefin is a gas, liquid and/or solid. In an embodiment, the olefin is a gas. In an embodiment, the at least one olefin is introduced into the first mixture under positive pressure, for example from 1-10 pound-force per square inch (psi), preferably 2-9 psi, 3-8 psi, 4-7 psi, or 5-6 psi. In some embodiments, the polymerization mixture may be fully saturated or partially saturated with gaseous olefin monomer. Preferably, the olefin monomer is added to the polymerization mixture until saturation. The quantity of the olefin(s) added into the polymerization mixture may be controlled and adjusted in order to control the molecular weight and branching of the polyolefin produced. In an embodiment, the olefin gas may be continuously fed into the second mixture and throughout the polymerization reaction (as described later) to maintain the positive pressure. Therefore, as the pressure of olefin gas is maintained, a polymerization reaction may continue until the catalysts are no longer viable.

At step 106, the method 100 further includes adding an aluminoxane cocatalyst to the second mixture and reacting for at least 10 minutes to form a reaction mixture including the polyolefin. The metallocene catalyst in a Ziegler-Natta polymerization reaction may be accurately referred to as a pre-catalyst, it is not responsible for the catalytic polymerization. Instead, the metallocene or zirconocene converts to the active catalyst in-situ after reaction with a co-catalyst. A co-catalyst is a chemical species that acts upon a catalyst for reaction to occur, or that improves the catalytic activity of a catalyst by acting as a promoter in a cooperative catalytic process. In the Ziegler-Natta reaction, the co-catalyst may be an organoaluminum compound which performs a ligand exchange reaction with the metallocene catalyst, ultimately forming a cationic metal species that catalyzes the olefin polymerization reaction. In the present method, the organoaluminum co-catalyst may be an aluminoxane co-catalyst.

In some embodiments, the aluminoxane cocatalyst is methylaluminoxane, ethylaluminoxane, propylaluminoxane, or butylaluminoxane. In a preferred embodiment, the aluminoxane catalyst is methylaluminoxane.

In an embodiment, a weight ratio of the zirconocene catalyst complex to the aluminoxane catalyst is 30:1 to 70:1, preferably 35:1 to 65:1, preferably 40:1 to 60:1, preferably 45:1 to 55:1, preferably 50:1 to 53:1, preferably about 52:1. The aluminoxane co-catalyst is preferably added to the polymerization mixture as a solution in organic solvent (e.g., in toluene), most preferably, the aluminoxane co-catalyst is the last component added to the polymerization reaction.

Other organoaluminum co-catalysts may be utilized in addition to, or in lieu of, the alkylaluminoxane co-catalysts above, examples of which include the C1-C12 trialkylaluminum compounds described above (e.g., trimethylaluminum, triethylaluminum, triisopropylaluminum, tri-n-propylaluminum, triisobutylaluminum, tri-n-pentylaluminum, trioctylaluminum), C1-C12 dialkylaluminum monohalides (e.g., diethylaluminum monochloride, diethylaluminum monobromide, diethylaluminum monoiodide, diisopropylaluminum monochloride, diisobutylaluminum monochloride, and dioctylaluminum monochloride), C1-C12 alkylaluminum sesquihalides (e.g., methylaluminum sesquichloride, ethylaluminum sesquichloride, ethylaluminum sesquibromide, and butylaluminum sesquichloride), as well as mixtures thereof.

In some embodiments, the polymerization reaction is for at least 10 minutes, preferably 30 mins, 1 hour, 2 hours, 3 hours, 4 hours, 5 hours, 6 hours, 7 hours, 8 hours, 9 hours, 10 hours, 11 hours, 12 hours, or 24 hours. In an embodiment, the polymerization reaction occurs until the catalysts are no longer viable. In an embodiment, the reaction is quenched with an acid and/or an alcoholic solvent, for example, acidic methanol. In an embodiment, the reaction is quenched by washing with methanol including 4-6% HCl. In an embodiment, the polymerization reaction may be performed at room temperature or at elevated temperature, for example, the polymerization mixture may be optionally heated up to 100° C., preferably up to 80° C., preferably up to 60° C., preferably up to 40° C., preferably up to 30° C.

In a preferable embodiment of the invention, the nonpolar solvent (preferably toluene) supersaturated with the olefin is continuously added to the reactor during the reacting time. Supersaturation of the olefin mixture in the nonpolar solvent provides mixtures that contain 5-15 wt. %, preferably 7-12 wt. % or about 10 wt. % of the olefin based on the total weight of the olefin and the nonpolar solvent. In order to achieve supersaturation the toluene must be pressurized with the olefin mixture and injected under pressure into the polymerization reactor. In an embodiment, the pressure is 1-20 psi, preferably 5-15 psi, or approximately 10 psi. In an embodiment, the reaction takes place in a reactor with a cubic, spherical, or hemispherical shape. The supersaturated solution is preferably injected at a plurality of locations at the bottom of the polymerization reactor. In a preferred embodiment, the supersaturated solution is injected circumferentially around a hemispherical bottom portion of the polymerization reactor. Injection of the supersaturated solution in this manner encourages mixing of the supported catalyst in the polymerization reactor, e.g., by turbulence cause by rapid depressurization of the supersaturated solution. Excess toluene solvent may be removed slowly from a location near the liquid line of the solvent in the polymerization reactor. The solvent is preferably removed through a strainer that blocks passage of the supported catalyst but otherwise permits toluene to exit the reactor under pressure.

At step 108, the method 100 further includes separating the polyolefin from the reaction mixture. In some embodiments, the polyolefin is separated by any method known to those with skill in the art. In some embodiments, the polyolefin is separated from the reaction mixture via filtration or centrifugation. In some embodiments, the filtered polyolefin is further dried for a range of 35° C. to 45° C. for a time duration of 10-20 hours, preferably 12-18, or 14-16 hours.

Further, the polyolefin may be additionally altered after formation to instill any desired polymer properties. The additional alterations may comprise any post polymerization technique that modifies polymeric properties, such as vulcanization, grafting, and/or cross-linking. Further downstream polymer processing techniques, such as blow molding, thermoforming, coating, extrusion, injection molding, fiber spinning, filament winding, pultrusion, and the like are considered to be within the scope of the present method.

After the in-situ polymerization, the polyolefin may be manipulated/manufactured to have any desired shape. For example, the polyolefin may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the polyethylene may be subject to known plastic processing steps, and thus may be melted, blended, extruded, molded, compressed, casted, cooled, solidified, etc. to have any desirable shape suitable for a particular application.

In some embodiments, the presence the LDH support during polymerization impacts the structure and properties of the polymer produced. In an embodiment, enough LDH is employed in the polymerization method so as to produce a polyolefin having 0.05 to 3 wt. %, preferably 0.1 to 3 wt. %, preferably 0.2 to 3 wt. %, preferably 0.4 to 2.5 wt. %, preferably 0.6 to 2 wt. %, preferably 0.8 to 1.8 wt. %, preferably 1 to 1.6 wt. % of the support (LDH) relative to a total weight of the polyolefin.

In the supported catalyst complex, the LDH can behave as a barrier by only allowing an amount of olefin to interact with the catalyst by diffusing into the gaps of the LDH at any time during the polymerization reaction. In an embodiment, this may make a polyolefin with only one fraction and reduce the amount of branching. The LDH can also scavenge the released combustible gases during polymerization, due to the presence of many ions in the LDH. Therefore, it may impart resistance against thermal degradation and facilitate better thermal stability. In this method, the catalyst is on the surface or in the gaps of the LDH and the olefin monomer(s) may be adsorbed in the gaps of the LDH for polymerization to occur. Where the size of the gap effects how much of the olefin is able to be adsorbed at any given time.

As described previously the intercalating DDS anion in an LDH increases the basal spacing and therefore may allow more of the olefin to penetrate between the layers and interact with the zirconocene complex supported on the LDH. The effect may further be supported by the use of larger metal cations in the LDH such as zinc. Supporting the zirconocene complex on an LDH results in improved reaction conditions and improved thermal properties of the resulting polymer.

Catalyst activity is measured by the amount of catalyst added to the reaction in kg, per mol of olefin, per hour of reaction duration, and per pressure of the olefin in the reaction in bar. In some embodiments, the supported catalyst complex has a higher activity than a zirconocene complex that is not supported on an LDH or any support. In an embodiment, the activity of the supported catalyst complex is 1% higher, preferably 5%, 10%, 15%, 20%, 25%, 30%, 35%, 40%, 45%, or 50% higher than a zirconocene complex is not supported on an LDH or any support. In an embodiment, the supported catalyst complex has an activity of 600-1,100 kg/mol/hr/bar, preferably 650-1,050, 700-1,000, 750-950, 800-900 or approximately 850 kg/mol/hr/bar. The higher activity of the catalyst in the supported catalyst complex allows for more olefin to be made.

In some embodiments, the polyolefin made with the supported catalyst complex has a higher yield than a polyolefin made by the same method but where the zirconocene complex is not supported on an LDH, and no LDH is present in the polymerization reaction. In an embodiment, the yield of the polyolefin made with the supported catalyst complex is 1% higher, preferably 5%, 10%, 15%, 20%, 25%, 30%, 35%, 40%, 45%, or 50% higher than a polyolefin made by the same method but where the zirconocene complex is not supported on an LDH, and no LDH is present in the polymerization reaction.

In some embodiments, the polyolefin made with the supported catalyst complex has a higher melting temperature than a polyolefin made by the same method but where the zirconocene complex is not supported on an LDH, and no LDH is present in the polymerization reaction. In some embodiments, the polyolefin made with the supported catalyst complex has a melting temperature at least 1° C. higher, preferably 3° C., 5° C., 7° C., 9° C., 11° C., 13° C., or 15° C. higher, than a polyolefin made by the same method but where the zirconocene complex is not supported on an LDH, and no LDH is present in the polymerization reaction. In an embodiment, the polyolefin has a melting temperature of 120-130° C., preferably 121-129° C., 122-128° C., 123-127° C., 124-126° C., or approximately 125° C. In a preferred embodiment, the polyolefin made with the supported catalyst complex has a unimodal, or only one, melting temperature. In an embodiment, the polyolefin has one fraction of polymer. In some embodiments, the polyolefin made with the supported catalyst complex has 2, 3, 4, 5, or 6 melting temperatures. In an embodiment, the polyolefin has multiple fractions of different branched polymers.

In some embodiments, the polyolefin made with the supported catalyst complex has a higher thermal stability than a polyolefin made by the same method but where the zirconocene complex is not supported on an LDH, and no LDH is present in the polymerization reaction. In some embodiments, the polyolefin made with the supported catalyst complex is stable up to 400° C., preferably 450° C., or 500° C. In some embodiments, the polyolefin made with the supported catalyst complex is stable from 400-460° C., preferably 410-450° C., 420-440° C., or approximately 430° C. In some embodiments, the polyolefin made with the supported catalyst complex is stable from 430-450° C.

EXAMPLES

The following examples describe and demonstrate exemplary embodiments of the method of making the polyolefin described herein. The examples are provided solely for the purpose of illustration and are not to be construed as limitations of the present disclosure, as many variations thereof are possible without departing from the spirit and scope of the present disclosure.

Materials Required

Ethene and propene (EP) (95:05) gas mixture with 99% purity, Bis(cyclopentadienyl)Zirconium(IV)dichloride(Zr), modified methylaluminoxane (MAO), Zinc nitrate hexahydrate [$Zn(NO_3)_2 \cdot 6H_2O$] $Ni(NO_3)_2 \cdot 6H_2O$ and other metal precursor salts, sodium dodecyl sulfate, toluene, ethanol, methanol.

Example 1: Synthesis of the LDH

The components of the LDH were varied. Different LDHs were made including ZnAl, MgAl, MgFe, NiFe, NiAl, and then the intercalating anion of the LDH was varied including, dodecyl sulfate (DDS), nitrate ($NO_3$), carbonate ($CO_3$), and carbonate/acetone ($CO_3$/Acetone). The reported combinations include, NiFe-DDS, NiFe—$NO_3$, NiFe—$CO_3$, NiFe—$CO_3$/Acetone, ZnAl-DDS, MgAl-DDS, MgFe-DDS, NiAl-DDS. Herein the synthesis of NiFe LDH is reported, however other LDHs were produced by a similar co-precipitation method. The salts precursor solution was prepared by mixing 8.73 g of $Ni^{2+}$ and 4.04 g of $Fe^{3+}$ with the molar ratio of 3:1 ($M^{2+}:M^{3+}$) in 50 mL deionized water under vigorous stirring at 60° C. for 15 minutes. A precursor salt (0.02 mol) solution of the anion to be intercalated in the LDH was prepared in 50 mL of water. The metal salt solution was added dropwise to the precursor salt solution at a pH equal to 10±0.1 maintained by 2M NaOH solution. The whole suspension was then allowed to reflux for 24 h at 70° C. under continuous magnetic stirring followed by centrifuging and washing with deionized water and pure ethanol to remove any impurities. The wet NiFe LDH cake was dried in a vacuum oven at 60° C. for 20 hours. The dried LDH powder was afforded by grinding and sieving (particle size<200 mesh).

Figure 5:
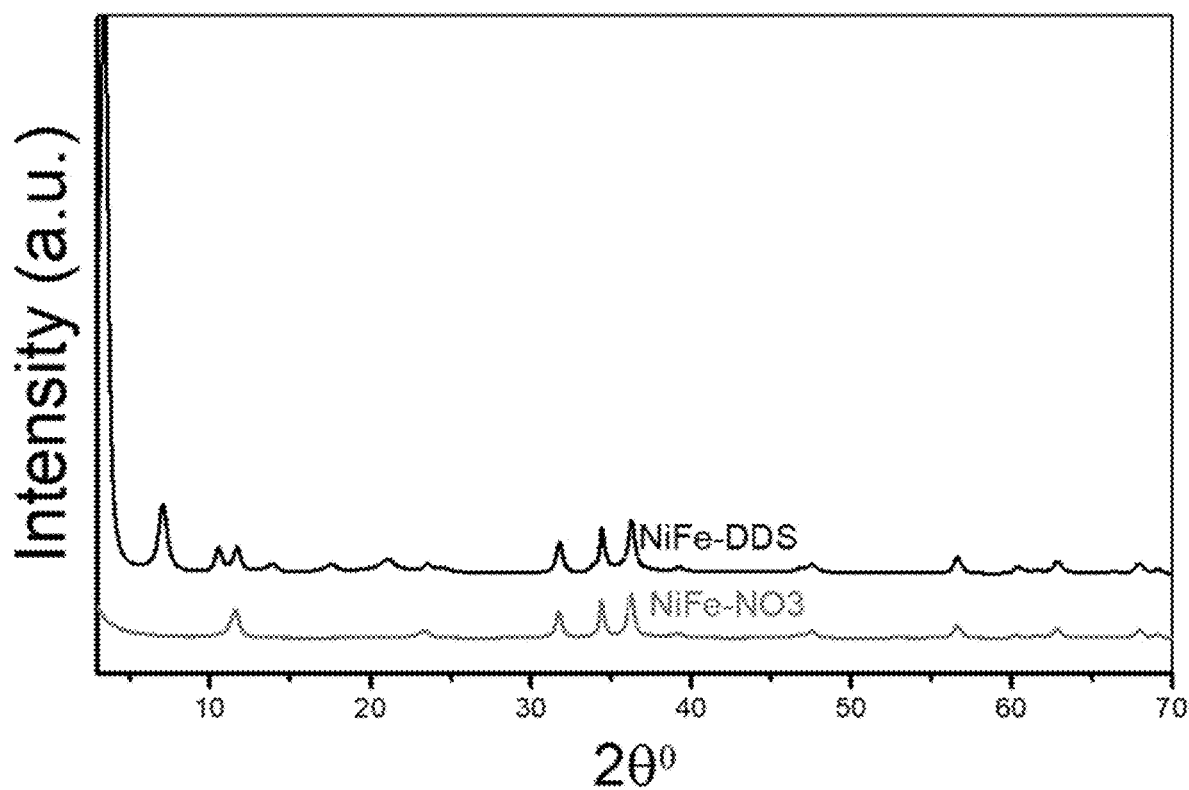
FIG. 5 is an X-ray diffraction (XRD) plot depicting diffraction peaks of NiFe—$NO_3$ and NiFe-DDS according to certain embodiments of the present disclosure.

The LDH with intercalated nitrate or carbonate anion exhibits an average basal spacing of 0.7-0.8 nm based on the peak between 10 and 11° in the NiFe—$NO_3$ plot in FIG. 5. An LDH was also treated with anionic surfactant (sodium dodecyl sulfate) to form delaminated LDH. The DDS anion was intercalated into the galleries of delaminated LDHs through an ion-exchange method and direct intercalation. The modified LDH-DDS has a very high basal spacing of 2.4 nm based on the peak between 3 and 4° in the NiFe-DDS plot in FIG. 5.

Example 2: Thermal Treatment of the LDH

The different LDHs were used as the support of the catalyst. Due to the presence of hydroxyl ions and free water molecules in the layers of the LDH, they are preferably thermally treated before immobilizing the catalyst. LDHs were thermally treated at a temperature of 150° C. for 6 hours in a nitrogen environment. Subsequently, the LDHs were transferred to the glove box to avoid the absorption of any moisture.

Example 3: Support of the Catalyst on the LDH

The zirconocene (Zr) complex was supported on the LDHs based on the methodology reported by Hickman et al with modification (Hickman, G. E., Wright, C. M. R., Kilpatrick, A. F. R., Turner, Z. R., Buffet, J. C., O'Hare, D.: Synthesis, characterization and slurry phase ethylene polymerisation of rac-(PhBBI*)ZrCl2 immobilised on modified layered double hydroxides. Mol. Catal. 468, 139-147 (2019).

The supported catalyst synthesis has two steps (1) support activation with the co-catalyst, modified methylaluminoxane (MAO 7% MAO in toluene, purchased from Sigma Aldrich), and (2) immobilization of the zirconocene complex over the activated support. The thermally treated LDHs were contacted with the solution of MMAO in toluene. 3.3 mL MAO (7% MAO in toluene) was added in 10 mL toluene, and then 100 mg of LDH was added. The suspension was maintained at 80° C. and stirred every 10 min for 2 hr until the supernatant liquid became clear and colorless. The solvent was removed by application of vacuum to obtain a dried activated support of MAO/LDH. 0.13 mmol of the Zr catalyst was added to the activated support followed by 10 mL of toluene solvent. The suspension was maintained at 60° C. with occasional stirring every 10 minutes for 1 hour until the suspension was clear and colorless. The supported catalyst was obtained by drying by vacuum.

The supported catalyst system, labeled throughout as Zr/LDH, was ground to powdered form in the glove box for the use in olefin polymerization.

Example 4: Polymerization Reaction

The polymerization was performed using homogenous bis(cyclopentadienyl) zirconium(IV) dichloride ($Cp_2ZrCl_2$), labeled as the Zr or zirconium complex, and Zr/LDH complexes. The Zr complex was supported on NiFe LDH with varying intercalated anions within the galleries of the NiFe LDH, including NiFe-DDS, NiFe—$NO_3$, NiFe—$CO_3$, NiFe—$CO_3$/Acetone. Additionally, the homogenous complex was also supported on various LDHs with keeping intercalated DDS anion fixed to form a Zr/LDH(DDS) complex, including NiFe-DDS, ZnAl-DDS, MgAl-DDS, MgFe-DDS, NiAl-DDS.

The in-situ copolymerization reaction of ethene and propene was carried out in a Schlenk flask at a temperature of 60° C. and a pressure of 5 psi under vigorous stirring conditions. Primarily, the reactor system included 80 mL toluene as solvent and 22 mg of the Zr/LDH supported catalyst complex, maintained at the specified temperature and pressure conditions. The nitrogen initially present in the reactor was evacuated through a vacuum pump and was then pressurized with a molar ratio of 95-05 ethene-propene gas at a pressure of 5 psi. After 10 minutes of feed gas saturation in the toluene solvent, 5 mL of MAO co-catalyst was injected into the system to initiate the polymerization reaction. The reaction was carried out for 30 minutes followed by quenching with 100 mL of methanol containing 5% HCl for 45 minutes. The product was washed with an excess of methanol and filtered off, and the final product was obtained after drying at 40° C. for 16 hours.

The resulting polymer is labeled as "EP" due to the polymerization of ethene and propene. A control of a polyolefin made without the Zr catalyst supported on an LDH, and no LDH is present in the reaction is labeled as "Neat EP". The Neat EP is made under the same conditions described above but without an LDH present.

Example 5: DSC Method

A differential scanning calorimeter (DSC Q1000, TA Instruments) was used to characterize the thermal properties of polymerized samples in terms of peak crystallization and melting temperature. The DSC instrument was first calibrated using Indium and it was then subjected to a heat-cool-heat cycle. Nearly 5-6 grams of samples were collected in a hermetic pan, sealed with an aluminum lid. A similar empty pan-lid was used as a reference. The heating/cooling rate was maintained at 10° C./min under a nitrogen environment. Cycle-1 involved heating of samples from room temperature to 160° C., which erases their thermal history. The sample was maintained at 160° C. for 5 minutes followed by cooling to room temperature under cycle 2. The sample was again heated to 160° C. at the same ramp to complete cycle 3.

The experimental data obtained from cycle 2 and cycle 3 were used for the evaluation of crystallization temperature (Tc) and melting temperature (Tm) respectively.

Example 6: TGA Method

Thermo-gravimetric analysis (TGA) was performed to study the thermal stability of the produced polymer. SDT-Q600 TGA by TA instruments was utilized at a heating rate of 10° C./min. The samples were heated in an alumina pan from 30° C. to 800° C. in a nitrogen environment at a purge flow of 100 mL/min.

Example 7: Polymer Yield Characterization

Referring to FIG. 1A the LDH was kept constant (NiFe) and the intercalating anion was varied including DDS, $NO_3$, $CO_3$, and $CO_3$/Acetone. The yield of polymer and activity of the catalyst (kg of EP per mol of catalyst per time and per pressure of olefin) were compared based on the intercalating anion as shown in FIG. 1A and Table 1. The anions DDS, and $NO_3$ affected the activity of the catalyst complex where the polymer yield afforded was higher than the neat EP product yield. Whereas the intercalating anions of $CO_3$, and $CO_3$/Acetone had a lower yield of polymer compared to the neat EP.

TABLE 1

Effect of the intercalated anion on the activity of Zr/LDH supported catalyst.

| | | Yield | Activity (kg EP/mol/hr/bar) |
|---|---|---|---|
| Anion effect | Neat EP | 3.12 | 881.868 |
| | $NO_3$ | 3.61 | 1020.3665 |
| | $CO_3$ | 2.3 | 650.095 |
| | $CO_3$/Acetone | 2.25 | 635.9625 |
| | DDS | 3.67 | 1037.3255 |

Figure 1B:
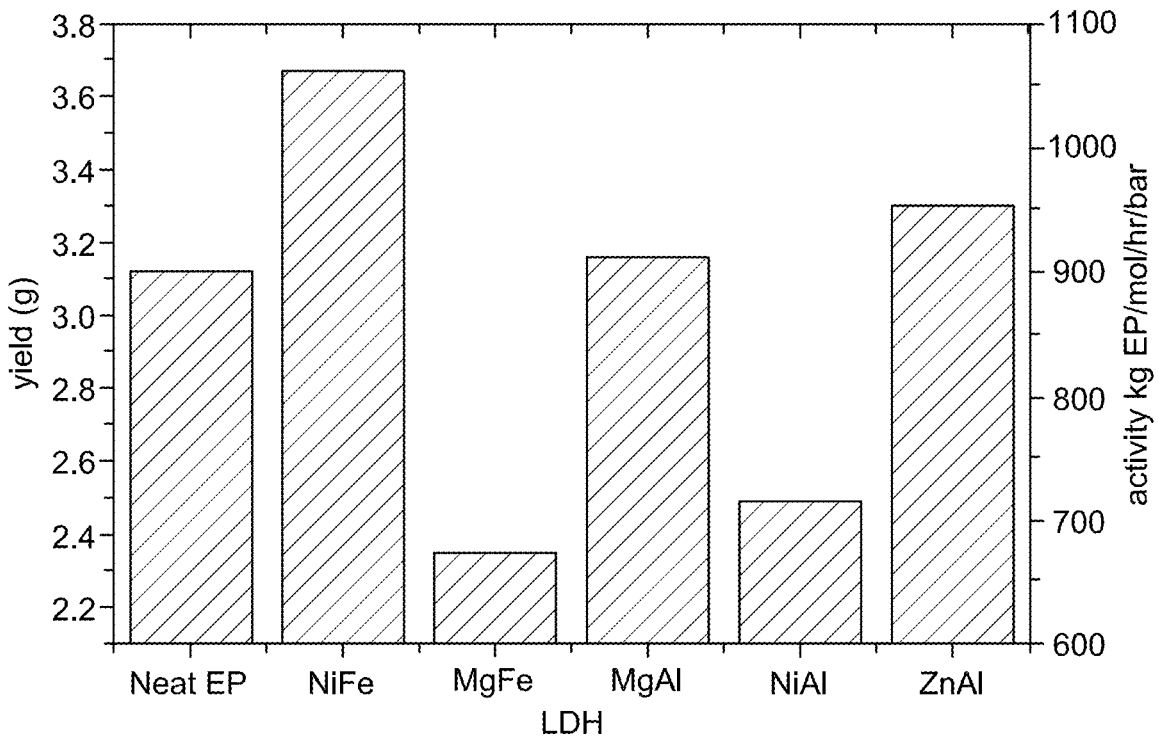
FIG. 1B is a graph depicting the yield of polymer and the activity of the catalyst (kg of EP per mol of catalyst per time and per pressure of olefin), while the intercalating anion was kept constant (DDS) and the LDH was varied including NiFe, MgFe, MgAl, NiAl, and ZnAl, according to certain embodiments of the present disclosure.

Referring to FIG. 1B the intercalating anion was kept constant (DDS) and the LDH was varied including NiFe, MgFe, MgAl, NiAl, and ZnAl. The yield of polymer and activity of the catalyst (kg of EP per mol of catalyst per time and per pressure of olefin) were compared based on the LDH as shown in FIG. 1B and Table 2. The NiFe, ZnAl, and MgAl affected the activity of the catalyst complex where the polymer yield afforded was higher than the neat EP product yield. Whereas the LDHs, MgFe and NiAl, had a lower yield of polymer compared to the neat EP.

TABLE 2

Effect of the LDH on the activity of Zr/LDH supported catalyst.

| | | Yield | Activity (kg EP/mol/hr/bar) |
|---|---|---|---|
| LDH effect | Neat EP | 3.12 | 881.868 |
| | NiFe | 3.61 | 1020.3665 |
| | MgFe | 2.35 | 664.2275 |
| | MgAl | 3.16 | 893.174 |

TABLE 2-continued

Effect of the LDH on the activity of Zr/LDH supported catalyst.

|      | Yield | Activity (kg EP/mol/hr/bar) |
|------|-------|------------------------------|
| NiAl | 2.49  | 703.7985                     |
| ZnAl | 3.3   | 932.745                      |

Example 8: DSC Characterization

Figure 2B:
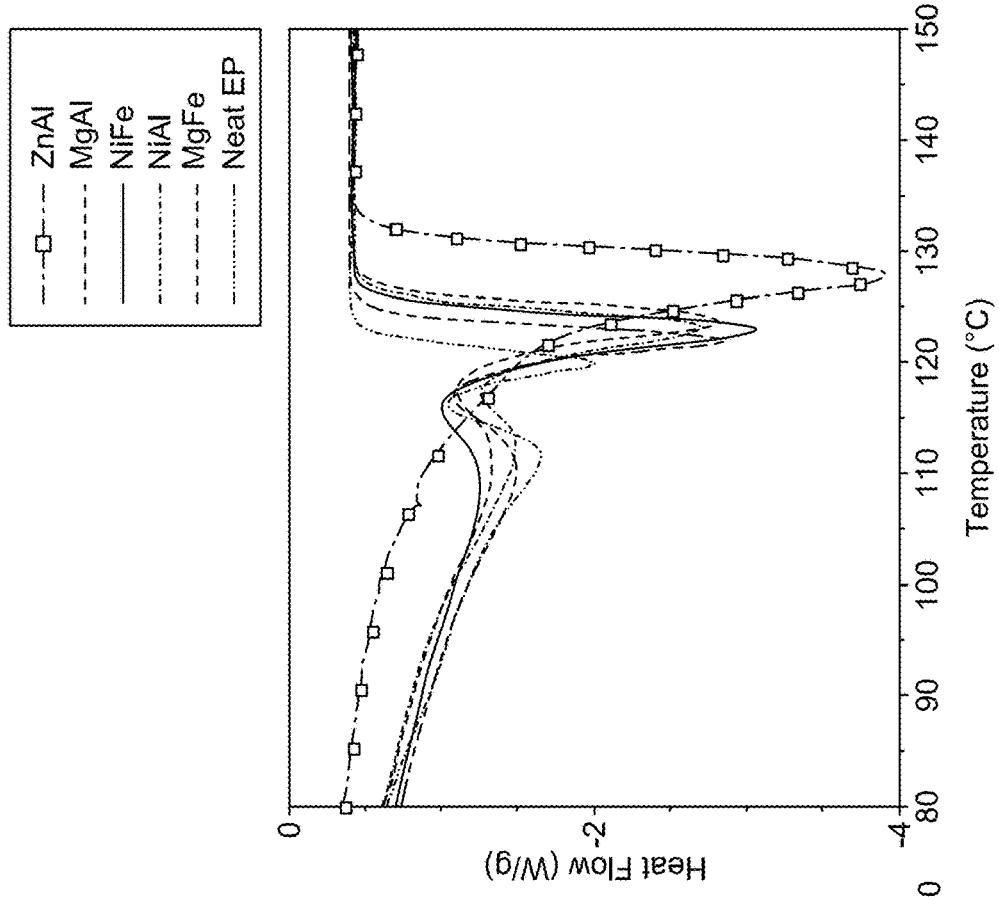
FIG. 2B is a DSC analysis plot depicting the $T_m$, while the intercalating anion was kept constant (DDS) and the LDH was varied including NiFe, MgFe, MgAl, NiAl, and ZnAl, according to certain embodiments of the present disclosure.
Figure 2A:
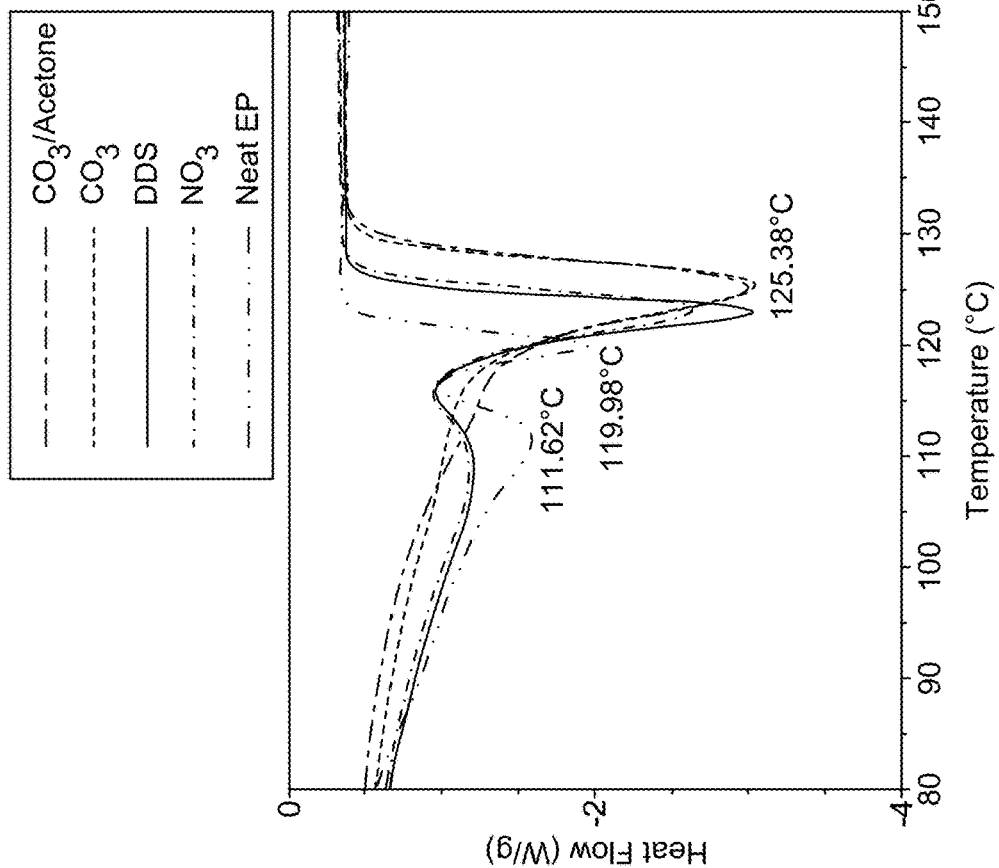
FIG. 2A is a differential scanning calorimetry (DSC) analysis plot depicting a melting temperature ($T_m$), while the LDH was kept constant (NiFe) and the intercalating anion was varied including DDS, $NO_3$, $CO_3$, and $CO_3$/Acetone, according to certain embodiments of the present disclosure.

The DSC plots of neat EP and EP/Zr/LDHs are shown in FIGS. 2A and 2B. Referring to FIG. 2A the LDH was kept constant (NiFe) and the intercalating anion was varied including DDS, $NO_3$, $CO_3$, and $CO_3$/Acetone. Referring to FIG. 2B the intercalating anion was kept constant (DDS) and the LDH was varied including NiFe, MgFe, MgAl, NiAl, and ZnAl. The copolymers made with the Zr/LDH exhibited a change in the melting temperature with respect to the neat EP. It is the sole attribute of the application of a supported catalyst in polymer synthesis. The plot for the neat EP showed dual peaks at 111° C. and 119° C., which shows the presence of two fractions of polymers. While the application of the supported catalyst complex during the polymerization showed a reduction in the bimodality of the resultant polymer. The polymers synthesized using Zr/NiFe—$CO_3$ (FIG. 2A) and Zr/ZnAl-DDS (FIG. 2B) catalyst complexes had unimodality. All polymers afforded from the supported catalyst complex had a melting temperature (Tm) about 5° C. higher than the Tm of the neat EP sample. The polymer produced from Zr/ZnAl-DDS had the highest Tm of 129° C. with respect to the other polymers.

Example 9: TGA Characterization

The TGA plots of neat EP and EP/Zr/LDHs are shown in FIGS. 3A and 3B. Referring to FIG. 3A the LDH was kept constant (NiFe) and the intercalating anion was varied including DDS, $NO_3$, $CO_3$, and $CO_3$/Acetone. Referring to FIG. 3B the intercalating anion was kept constant (DDS) and the LDH was varied including NiFe, MgFe, MgAl, NiAl, and ZnAl.

The polymers made with all intercalating anions of the Zr/NiFe had an improved thermal stability (FIG. 3A). The temperature at 10% weight loss of the sample during the TGA analysis is denoted at $T_{0.9}$. The $T_{0.9}$ for the neat EP was 428° C., while the $T_{0.9}$ corresponding to the polymers made with Zr/NiFe—$NO_3$ and Zr/NiFe-DDS was about 444° C. and the $T_{0.9}$ for the polymer made with Zr/NiFe—$CO_3$ was 448° C., which was highest with respect to others Zr/NiFe (anions). All polymers made with the supported catalyst complex Zr/LDH exhibited higher thermal stability than the neat EP. However, there was no effect of the metal components within the LDH on the thermal stability. $T_{0.9}$ for the Zr/ZnAl copolymer was 443.3° C., which was 15° C. higher than the corresponding $T_{0.9}$ of neat EP of 428° C. The incorporated LDH behaves as a barrier and scavenges the released combustible gases during polymerization. Therefore, it imparts resistance against thermal degradation and facilitates better thermal stability.

The present disclosure provides a method of making the polyolefin using a supported zirconocene catalyst which is easily available and possesses low cost and high stability. The polyolefin made with the supported catalyst has improved thermal properties.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of making a polyolefin, comprising:
   mixing a layered double hydroxide (LDH), and a zirconocene complex in a nonpolar solvent to form a first mixture;
   degassing the first mixture and adding an olefin to form a second mixture;
   adding an aluminoxane cocatalyst to the second mixture and reacting for at least 10 minutes to form a reaction mixture comprising the polyolefin; and
   separating the polyolefin from the reaction mixture;
   wherein the polyolefin has a melting temperature of 120-130° C.,
   wherein the zirconocene complex is supported on the LDH to form a supported catalyst complex in the first mixture,
   wherein the LDH is a NiFe LDH, and
   wherein an intercalating anion of the LDH is a dodecyl sulfate (DDS) anion.

2. The method of claim 1, wherein the mixing, the degassing, the adding and the reacting are carried out in a pressurized reactor, and the method further comprises:
   continuously injecting a supersaturated solution of the nonpolar solvent with the olefin during the reacting,
   wherein the supersaturated solution contains 5-15 wt. % of the olefin, based on the total weight of the olefin and the nonpolar solvent,
   wherein the supersaturated solution is injected under a pressure greater than the pressure in the reactor, and
   wherein the reactor has a hemispherical bottom and the supersaturated solution is injected at a plurality of locations evenly spaced around the circumference of the hemispherical bottom.

3. The method of claim 1, wherein the polyolefin has a unimodal melting temperature of 123-127° C.

4. The method of claim 1, wherein the polyolefin is stable up to 450° C.

5. The method of claim 1, wherein the polyolefin is stable from 430-450° C.

6. The method of claim 1, wherein the supported catalyst complex has a weight ratio of the zirconocene complex to the LDH of 1 to 1-5.

7. The method of claim 1, wherein a molar ratio of a first and second metal in the LDH 2:1 to 4:1.

8. The method of claim 1, wherein the layered double hydroxide has
   a basal spacing of 2.0-3.0 nm.

9. The method of claim 1, wherein the zirconocene complex is bis(cyclopentadienyl) zirconium(IV) dichloride.

10. The method of claim 1, wherein the aluminoxane cocatalyst is methylaluminoxane.

11. The method of claim 1, wherein the olefin is at least one selected from the group consisting of ethene, propene, and butene.

12. The method of claim 1, wherein the olefin is 70-95 volume percent (v %) ethene and 5-30 v % propene based on a total volume of the olefin.

13. The method of claim 1, wherein the olefin has a pressure of 1-10 psi in the second mixture.

14. The method of claim 1, wherein the first mixture has a supported catalyst complex concentration of 0.1-0.5 milligram per milliliter (mg/mL).

15. The method of claim 1, wherein the polyolefin has 0.05 to 3 wt. % of the LDH, relative to the total weight of the polyolefin.

16. The method of claim 1, wherein the polyolefin has a higher melting temperature than a polyolefin made by the same method but wherein the zirconocene complex is not supported on an LDH.

17. The method of claim 1, wherein the polyolefin has a higher yield than a polyolefin made by the same method but wherein the zirconocene complex is not supported on an LDH.

\* \* \* \* \*